US007147461B2

(12) United States Patent
Neary

(10) Patent No.: US 7,147,461 B2
(45) Date of Patent: *Dec. 12, 2006

(54) PARTIALLY-OPEN FIRED HEATER CYCLE PROVIDING HIGH THERMAL EFFICIENCIES AND ULTRA-LOW EMISSIONS

(76) Inventor: David Lloyd Neary, 3557 Kimble Dr., Plano, TX (US) 75025

(*) Notice: Subject to any disclaimer, the term of this patent is extended or adjusted under 35 U.S.C. 154(b) by 0 days.

This patent is subject to a terminal disclaimer.

(21) Appl. No.: 11/359,954

(22) Filed: Feb. 22, 2006

(65) Prior Publication Data

US 2006/0141407 A1 Jun. 29, 2006

Related U.S. Application Data

(63) Continuation-in-part of application No. 10/394,847, filed on Mar. 22, 2003, now Pat. No. 7,074,033.

(51) Int. Cl.
*F23J 9/00* (2006.01)

(52) U.S. Cl. ................. 431/5; 431/2; 431/11; 431/115; 60/784

(58) Field of Classification Search .................... 431/5, 431/9, 115, 116; 60/724
See application file for complete search history.

(56) References Cited

U.S. PATENT DOCUMENTS 3,466,351 A 9/1969 Velle
3,628,332 A 12/1971 Kelmar
3,779,212 A 12/1973 Wagner
4,030,874 A 6/1977 Vollerin
4,133,171 A 1/1979 Earnest et al.
4,204,401 A 5/1980 Earnest
4,405,587 A 9/1983 McGill et al.
4,498,289 A 2/1985 Osgerby
4,528,811 A 7/1985 Stahl
4,714,032 A 12/1987 Dickinson
5,060,722 A * 10/1991 Zdenek et al. .............. 165/170
5,086,754 A * 2/1992 Narang ................... 126/110 R
5,179,903 A 1/1993 Abboud et al.
5,450,801 A 9/1995 Abboud
5,545,032 A 8/1996 Jansohn et al.
5,724,805 A 3/1998 Golomb et al.
5,761,896 A 6/1998 Dowdy et al.
5,970,702 A 10/1999 Beichel
6,024,029 A 2/2000 Clark
6,029,588 A 2/2000 Baudhuin
6,216,611 B1 4/2001 Baudhuin
6,269,624 B1 8/2001 Frutschi et al.
6,401,633 B1 6/2002 Baudhuin
6,532,745 B1 * 3/2003 Neary ......................... 60/784
6,622,470 B1 9/2003 Viteri et al.
6,637,183 B1 10/2003 Viteri et al.
6,878,186 B1 * 4/2005 Neary ......................... 95/101

(Continued)

FOREIGN PATENT DOCUMENTS

JP 57-210205 12/1982

(Continued)

Primary Examiner—Carl D. Price

(57) ABSTRACT

A partially open fired heater regenerative cycle, wherein the fired industrial type heater cycle's heat transfer fluid replaces the air predominant nitrogen heat transfer fluid employed in a conventional air/fuel combustion heater, is disclosed. The heater cycle's method and apparatus are susceptible to providing a significant percent mass flow reduction of fugitive nitrogen oxide and carbon monoxide mass flow emissions as emitted by current art Low-NO.sub.x art heaters on a rated per million Btu per hour basis, and is further capable of developing exceptionally high steady-state heat transfer system cycle thermal efficiencies.

20 Claims, 3 Drawing Sheets

U.S. PATENT DOCUMENTS

2002/0006371 A1 1/2002 Watson et al.

FOREIGN PATENT DOCUMENTS

JP 04-117159 11/1993
JP 2000-337107 12/2000
WO WO 97/06352 2/1997
WO WO 99/51367 10/1999
WO WO 02/059524 A1 8/2002

* cited by examiner

PARTIALLY-OPEN FIRED HEATER CYCLE PROVIDING HIGH THERMAL EFFICIENCIES AND ULTRA-LOW EMISSIONS

CROSS REFERENCE TO RELATED APPLICATION

This application is a continuation-in-part of U.S. patent application Ser. No. 10/394,847, filed Mar. 22, 2003, and granted U.S. Pat. No. 7,074,033 with an issue date of Jul. 11, 2006, which is hereby incorporated by reference, and claims priority and the benefit under 35 U.S.C. § 120.

BACKGROUND

The present invention relates generally to a partially-open fired heater cycle providing high thermal efficiencies and ultra-low emissions.

In the case of conventional forced or induced draft burners employed within heater unit categories such as steam generators, boilers, tube heaters, process furnaces and process heaters, motor-driven fans or blowers provide the means of creating a forced or induced draft of atmospheric air into a heater unit's burner unit assembly.

For complete combustion of varied gaseous or liquid fuels, a 120% to 200% quantity of stoichiometric air was typically employed in earlier conventional heater and burner designs. The long resident times, in which high temperature extended length combustion was maintained within the earlier heaters, resulted in extremely high flue gas emissions. The supply of air is increased above stoichiometric level to both supply an excess of oxygen (hereafter may be referred to as O.sub.2) for completed combustion and for added fluid mass flow heat absorption to lower example air/methane stoichiometric adiabatic combustion flame zone gas temperatures below approximately 3300° F. Molecular portions of the predominant nitrogen (hereafter may be referred to as N.sub.2) mass within the air that are subsequently raised to temperatures 2600° F. and above, are susceptible to entering into completed endothermic chemical reactions that converts nitrogen to nitrogen oxide (hereafter may be referred to as NO.sub.x). Within the typical two or more air-fuel combustion zones, portions of the combustion zones produced carbon dioxide (hereafter may be referred to as CO.sub.2), and any CO.sub.2 that can be are introduced as a molecular component of re-circulated flue gas, can be subsequently raised to temperatures greater than 2600° F. and thereby being susceptible to entering into completed endothermic chemical reactions that converts CO.sub.2 into carbon monoxide (hereafter may be referred to as CO).

Conventional air-gas fuel fired burners are typically of a premix design, wherein a portion of the heater's air for burning is premixed with gaseous fuel before the fuel reaches a point at which combustion is initiated. A conventional partial-premix burner's function is to maximize the homogeneous mixing of specific amounts of air and fuel and cause the fuel to burn completely through exothermic chemical combustion processes within two or more zones of staged combustion. Typical current art low-NO.sub.x heater unit burners can employ a lean-burn first stage of combustion wherein a large excess of stoichiometric air is mixed with the first stage introduced fuel to insure complete fuel combustion, subsequently followed by second stage combustion wherein sufficient additional fuel is introduced into the rich oxygen bearing combustion gas stream emanating from the first stage of combustion to achieve an example excess 6% oxygen content in the second stage combustion exhaust.

Early styles of conventional air-liquid fuel burners are generally of the non-premix type, unless the liquid fuel can be converted into a vapor through atomization and vaporization immediately prior to burning.

Current art air-fuel heater Low-NO.sub.x burners can be of greatly varying designs that incorporate individual manufacturer's various preferred configurations of two or more combustion zones and flame patterns of varied shape, volume and length. The majority of current art heater applications employ burner assemblies whose actual zones of combustion reactions are projected into and carried forth within the boiler, steam generator, or process heater having an internal plenum or firebox space surrounded by heat transfer coils or tubes contained within. In the case of tube type heater applications, the burner assemblies actual zones of combustion reactions are projected into and carried forth internally within the fluid immersed heat exchanger tubes.

Within the last two decades, applications of industrial furnaces producing charges of molten materials and requiring higher product quality, lower operating costs, and lower fugitive exhaust emissions have collectively motivated the development of many varied and patented designs of oxy-fuel burners. These applications typically require furnace temperatures in the range of 3000° F. to 5000° F. To supply these temperature requirements, oxy-gas fuel burner designs provide the ignition, fuel and oxidant mixing means to develop the required projected flame temperature into the furnaces. The combustion flame can comprise one or two chemical reaction zones and the oxidant can be pure oxygen or a mixture of high purity oxygen and air. Re-circulation of interior furnace combustion gas can be aspirated into the burner by employed typical 10 bar high-pressure oxygen's expansion and developed high velocity within the burner, thereby reducing the combustion flame temperature from the potential maximum of 5000° F. Employment of an oxygen/air mixture in the oxy-fuel burner, to achieve a reduced combustion flame temperature, will result in the production of NO.sub.x in addition to the already produced carbon monoxide emissions.

The primary decades-old objective of a heater's burner design has been one of a burner design that provides stable and economical fuel burning throughout a normal prescribed range of operating conditions. More recently, this objective has been supplemented with the added objectives of both reducing fugitive emissions comprising NO.sub.x, CO, unburned hydrocarbons, and the reduction of CO.sub.2 within emitted flue exhaust gases. To achieve these new added objectives, a means of achieving consistent low controlled combustion zone temperatures and completed exothermic chemical combustion reactions are required by a heater's burner assembly. Together with the noted fugitive emission reduction requirements, a unit heater of higher thermal efficiency will yield a lower consumption of hydrocarbon fuels that result in lower CO.sub.2 emissions for a given heater's net fuel energy conversion requirement.

It has been well known and practiced for many decades that in the presence of higher humidity air or injection of water or steam into a conventional burner air supply stream or fuel combustor zone, there is an increase in combustion flame speeds and higher fuel combustion thermal efficiencies. With the development of exhaust emission measurement devices, it was later determined that the injection of water or steam also produced a very significant 40% to 60% reduction in existing 300 to 400 ppmv NO.sub.x and CO emissions. This reduction in fugitive emissions is achieved however with an accompanying significant added operating expensive for the production of de-mineralized boiler grade water required for steam or liquid water injection to prevent fouling of heat exchanger coils within a given type of heater. Current art Low-NO.sub.x boilers with 83% thermal efficiency and 9 to 10 ppmv NO.sub.x emissions extract and inject produced boiler steam into 2 or more stages of burner combustion.

It has also been well known and practiced for decades that partially re-circulating combustion flue gases containing binary molecular carbon dioxide and water vapor, into a burner's combustion zone, reduces flame temperatures and results in a reduced level of NO.sub.x and CO within a heater's exhaust flue gases. Due to the high temperatures and varied conventional burner designs' flame speeds and non-uniform temperatures throughout all portions of the multi-staged combustion zones, it is not possible to accurately predict what series of altered chemical reactions occur when water vapor and/or carbon dioxide are introduced into a given burner's currently developed individual fuel combustion zones.

To achieve higher heater unit thermal efficiencies, some current art heater designs incorporate a degree of heater exhaust gas circulation and air intake preheating through an air to heater exhaust heat exchanger that is air plenum-positioned between the heater's employed atmospheric air blower or fan discharge and the plenum connected heater's burner assembly. These exhaust heat to air recuperation exchanger designs, when coupled with current technology Low-NO.sub.x premix burners, have been successful in increasing a heater's thermal efficiency upward to an approximate 84% to 86% maximum efficiency value. However, preheating air tends to have the effect of increasing a burner's primary combustion zone temperature thereby increasing the burner susceptibility to increased NO.sub.x generation.

Present employed Low-NO.sub.x burner technology combining exhaust flue gas re-circulation into the heater's fuel burner combustion zone and injection of steam or water frequently produces approximately 25–28 ppmv NO.sub.x or 0.03 lb NO.sub.x within flue gases per million Btu of heater rating. The mass flow rate of employed flue gas re-circulation into the burner's combustion zone has been generally limited to a mass rate range equivalent to 15% to 30% of the 'produced combustion products mass rate' for best overall burner performance. This flue gas re-circulation rate equates to approximately 4% to 8% of the total conventional Low-NO.sub.x heater unit's combined exhausted flue gases.

Present best-employed Ultra-Low NO.sub.x burner technology to achieve natural gas fuel combustion exhaust emissions containing less than 9 to 10 ppmv NO.sub.x predominantly involves the large industrial heater manufacturer's utilization of selective catalytic reduction (hereafter may be referred to as SCR) assemblies with limited life cycles and higher operating and installed capital costs. In the SCR system, the exhaust gas first passes through an oxidizing catalyst that oxidizes carbon monoxide and unburned hydrocarbons into carbon dioxide and water vapor. A reagent is then mixed into the exhaust stream before its passage through a second catalyst (usually vanadium pentoxide), which results in the selective reduction of nitrogen oxide to form nitrogen and water vapor. These catalytic assemblies employ urea or ammonia as a required chemical reagent with the catalysis. The infrastructure to support wide scale and efficient distribution of these chemical reagents for nitrogen oxide emission reduction purposes has not been developed to date. SCR systems are generally not applied to liquid fuel burner applications, because the catalysts are fairly intolerant of sulfur or metallic elements prevailing within refined fuel oils.

Present best-employed burner technology to achieve low liquid fuel combustion exhaust emissions is primarily limited to the employment of: high pressure preheated liquid fuel to speed vaporization of the liquid fuel during injection within multiple high efficiency premix sub-assemblies contained within a burner assembly; and the injection of steam or boiler grade water into the burner fuel combustion zone. The rate of boiler grade water or steam injection can range between 0.10 to 0.30 lbs per lb of fuel.

In the case of best present day liquid fuel combustion, the present difficulties of rapidly completing a liquid fuel's complete combustion, while controlling an acceptable low combustion zone gaseous temperatures with current combustion techniques, results in elevated levels of fugitive emissions comprising nitrogen dioxides, carbon monoxide, and unburned hydrocarbons that are unacceptable in many environmental control area jurisdictions.

A present low-NOx heater system employs forced or induced draft supply of 106% stiochiometric atmospheric air as a source of oxygen that acts as an example methane fuel combustion oxidizer reactant and nitrogen comprises approximately 72% of the post-combustion zone gases. Due to its diatonic molecular structure, the nitrogen molecules within combustion zones are capable of absorbing and transferring combustion heat only through continued convective heat transfer means resulting from their collisions with other gaseous molecules of greater or lesser temperature.

The conventional and Low-NO.sub.x burner and burner design's inherit delay in rapidly establishing a sufficiently low combustion zone equilibrium gas temperature uniformly throughout its combustion zones, enables portions of the very high temperature predominant nitrogen molecular mass and lesser carbon dioxide molecular mass to enter into completed endothermic chemical reactions that produce NO.sub.x and CO.

To achieve the objective of greatly reducing a heater unit burner assembly's fugitive exhaust emissions and increasing thermal efficiencies and stable fuel burning throughout a normal prescribed range of operating conditions, it is necessary to alter both the fuel combustion chemical reaction formula and the means by which an acceptable range of controlled combustion zone temperatures can be uniformly maintained and distributed with greatly accelerated combustion heat transfer means.

All references cited herein are incorporated by reference to the maximum extent allowable by law. To the extent a reference may not be fully incorporated herein, it is incorporated by reference for background purposes and indicative of the knowledge of one of ordinary skill in the art.

SUMMARY

To achieve the objective of ultra-low fugitive heater flue gas exhaust emissions, the heater cycle system of the present invention employs a controllable continuous mass flow rate of re-circulated flue gas (hereafter may be referred to as "RFG") as a superheated vapor-state predominant mixture of carbon dioxide and water vapor in identical mixture Mol percent proportions as each occurs as generated products of chemical combustion reactions from the gaseous or liquid hydrocarbon fuel employed for combustion. The invention employs comparable means of achieving all cited heater cycle system objectives from its application of the essential thermodynamics and working fluid means of the partially-open gas turbine cycle as described in the inventor's granted U.S. Pat. No. 6,532,745.

Provided herein is a partially-open heater cycle system of particular suitability as a power plant replacement to steam generators and boilers that cannot be economically modified to achieve current and future mandated emission requirements and/or where operating fuel costs demands the employment of best available technology (hereafter may be referred to as BAT) that provides greatly increased thermal efficiency in the production of steam for a power plant's existing stream turbine powered electric generators. In petrochemical, refining, and petroleum production facilities where both electric power production, process steam and/or process fluid heating are employed, the invention's ultra-low emissions and high thermal efficiencies are equally applicable. Typical heating apparatus systems employing industrial or heavy-duty commercial-type forced or induced draft combustion heater categories including steam generators or hot water boilers, tube heaters, and process heaters, hereafter are collectively referred to simply as "heaters". These employed heaters incorporate motor-driven blowers or compressors that provide the means of creating a forced or induced draft of heater cycle system re-pressurized RFG into a heater unit's combined burner and heat exchanger sections. The partially-open heater cycle system can further be used with the employment of alternative or unconventional configurations or designs of burners, heat exchangers, blowers or compressors, and other auxiliary components that can utilize existing manufactured equipment components which are not specifically designed for, nor applied to, the manufacture of current technology heater systems.

The heater cycle system of the present invention has as a first objective the provision for both complete operating cycle system component means and a predominant non-nitrogen molecular composition of re-circulated flue gas and heat transfer fluid (hereafter may be referred to as HTF) with molecular characteristics of gas heat capacity and infrared heat transfer characteristics which enables mass flow fugitive exhaust emissions of NO.sub.x and CO to be reduced by up to 95% to 98% from that of current art Low-NO.sub.x designed heaters capable of producing respective 10 ppmv and 25 ppmv NO.sub.x. emissions. This emission reduction objective is achieved from the heat cycle system employment of controlled streams of re-pressurized of RFG, fuel, and low pressure predominant oxygen that collectively provides the means for extremely rapid combustion at controlled temperatures within the primary combustion zone. It is a second objective of the invention to achieve significantly higher thermal efficiencies than are currently achieved with the operation of current art Low-NO.sub.x combustion heater systems. This objective is met with the said heater cycle system thermal efficiencies exceeding 124% over an example 800° F. to 1800° F. range of high superheat temperature HTF operating temperature conditions. By achieving the objective of higher thermal efficiency, the heater cycle system proportionally reduces the amount of developed CO.sub.2 "greenhouse gas emissions" as compared to current art efficiency heaters of equal Btu/Hr. heat rating and with 84% to 86% maximum thermal efficiencies.

It is a third objective of the invention to lower the physical size and installed cost of heat exchanger sections contained with a given rated heater cycle unit by providing the HTF means by which a greatly accelerated rate of predominantly radiated heat is transferred from the HTF into the process coils or tubes contained within each heat exchanger section. This objective is satisfied with the heater cycle's suitable operational compatibility with current art forms of waste heat recovery (hereafter may be referred to as WHRU) units and heat recovery steam generator (hereafter may be referred to as HRSG) units having compact modular-section designs that are typically applied to current gas turbine co-generation and combined-cycle power generation facilities.

It is a fourth objective of the invention to provide the heater cycle system fluid stream flow control means and other control means by which the heater cycle system is capable of not less than a 10 to 1 turndown in rated heat output while maintaining stable fuel combustion with ultra-low fugitive emissions and high thermal efficiencies.

The heater cycle system and typical equipment components described herein include the common objective means by which the heater cycle system and separately associated facility auxiliaries are monitored and controlled for safe operation while controlling the heater cycle system heat transfer fluid flows in response to changes in water, steam or process fluid heating demands.

The combined heater's burner assembly, heat exchanger section, and primary RFG blower or primary RFG compressor safe operating and output functions can be monitored and controlled by a manufacturer's supplied PLC based control panel. The programmable logic controller (hereafter may be referred to as PLC) control panel design standards shall be based on the standards as set forth in the American Petroleum Institute (API) Standards for Fired Heaters for General Refinery Service (API 560) and may be further control-integrated with an industrial facility's distributive control system (hereafter may be referred to as DCS). An industrial facility's individual auxiliary systems' modular equipment PLC control panel operating output data signals can be collectively control-integrated into the DCS together with the operating heater cycle operating data signals comprising but not limited to:

(a) the heater cycle's system individual mass flow sensor-transmitter controlled streams of fuel, RFG collection manifold stream, first primary re-pressurized RFG stream, and the cycle system primary re-pressurized RFG atmospheric vented stream with individual respective stream sensor-transmitted temperatures and pressures for a given operating hydrocarbon fuel composition and thermal energy output;

(b) the heater cycle system RFG excess stoichiometric percentage oxygen content sensor-transmitter contained within the RFG collection manifold for a given operating hydrocarbon fuel composition;

(c) the heater cycle system heater unit burner assembly HTF sensor/transmitted stream temperature entering heat exchanger means comprising either one or more series positioned heat exchanger sections or two or more parallel-positioned heat transfer exchanger sections, each containing fluid heat exchange coils or tubes mounted therein, and heat exchanger section HTF exhaust stream temperature sensor-transmitter means contained within the RFG collection manifold;

(d) the heater cycle's system positioning-state of any control system actuated capacity control apparatus means;

(e) the heater cycle's system mean average temperature from one or more multiple temperature sensor-transmitters inserted into the burner unit primary combustion zone gaseous stream entering the burner assembly internal tertiary blending zone.

It is a additional fifth objective of this invention to provide the means wherein, during a steady-state rated heater operation for the example varied temperature ranges, whereby the open portion of the cycle is controlled within a range of control valve venting to atmospheric of excess primary re-pressurized RFG mass flow rate approximately equivalent to 2.9% to 9.7% of the primary re-pressurized RFG over the cycle example high temperature HTF range of respective 800° F. to 1800° F. temperatures entering the heater's heat exchanger section.

Other objects, features, and advantages of the present invention will become apparent with reference to the drawings and detailed description that follow.

DESCRIPTION

Figure 1:
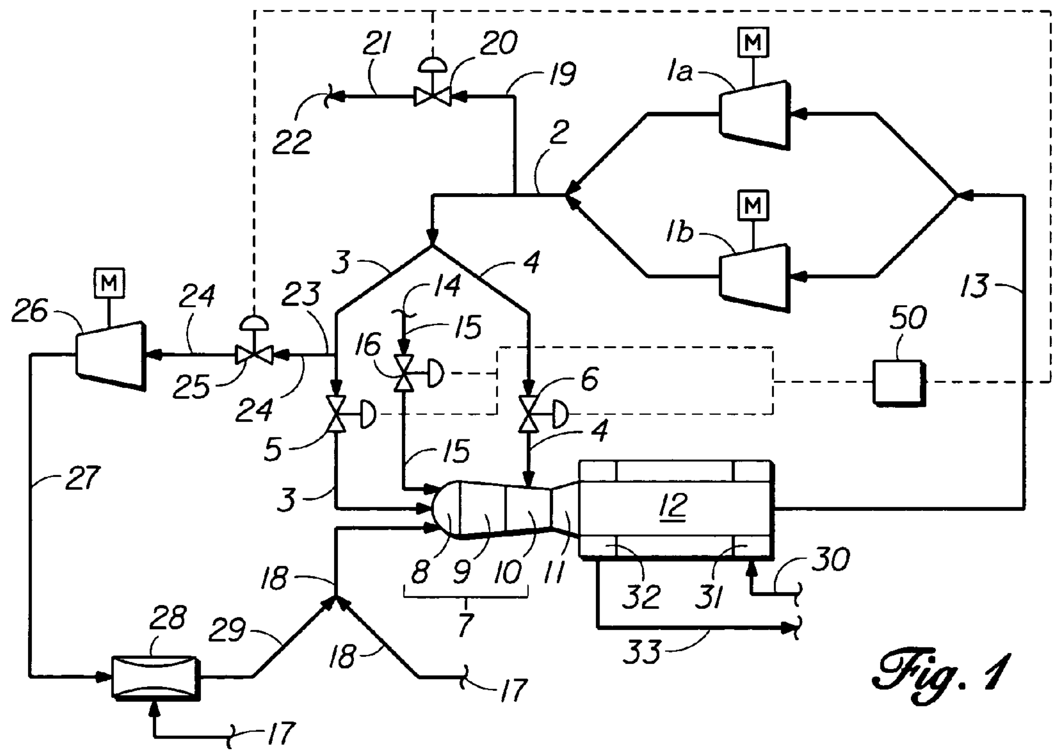
FIG. 1 is a schematic flow diagram of the invention's partially-open heater cycle system comprising example 'base configuration' system components and one example 'alternate configuration' auxiliary component means for the supply of an alternate composition of predominant oxygen stream for combustion purposes.

In the following detailed description of the preferred embodiments, reference is made to the accompanying drawings, which form a part hereof, and in which is shown by way of illustration specific preferred embodiments in which the invention may be practiced. These embodiments are described in sufficient detail to enable those skilled in the art to practice the invention, and it is understood that other embodiments may be utilized and that logical changes may be made without departing from the spirit or scope of the invention. To avoid detail not necessary to enable those skilled in the art to practice the invention, the description may omit certain information known to those skilled in the art. The following detailed description is, therefore, not to be taken in a limiting sense, and the scope of the present invention is defined only by the appended claims.

A. Description of Alternative Embodiments

In the first embodiment, this invention's common molecular composition of highly superheated "heat transfer fluid" produced within the heater unit may hereafter be referred to as HTF. In conventional heater applications, the hot gases exhausted from a heater unit are commonly referred to as "flue gases". For invention descriptive purposes, immediately following its lowered temperature discharge from the heater unit heat exchanger section or sections, the HTF is thereafter referred to as "re-circulated flue gas" or more simply referred to as "RFG".

The burner assembly produced HTF comprises a continuous highly superheated vapor mixture of predominant carbon dioxide and water vapor in identical Mol percent ratio proportions as these molecular combustion product components are produced from the combustion of the employed gaseous or liquid fuel. Within the predominantly closed portion of the cycle, the HTF is exhausted from the one or more heat exchanger section with a small degree of superheat temperature and a positive gauge pressure and with flow connectivity to the RFG collection manifold. The RFG collection manifold can be end-connected downstream to either one series-positioned or to two parallel-positioned primary RFG blower or primary RFG compressor.

The RFG re-circulation and following primary re-pressurization of the RFG flow stream is performed by either one or by two typical high-temperature industrial blower of fan-style, axial-style, radial/centrifugal-style, or a compressor of the axial, centrifugal, or rotating positive displacement type. Either means of RFG flow re-pressurization can incorporate means of RFG mass flow control available internally within the primary RFG blower or primary RFG compressor or by speed control of the motor-driver, with RFG flow changes being initiated by a master system control panel containing programmable microprocessors.

The heater cycle system primary RFG blower or primary RFG compressor means produces a differential pressure increase (with slight temperature increase) to the RFG flow that is equivalent to the total pressure drop across the heater cycle's closed-loop system. The RFG flow of increased pressure and temperature is hereafter referred to as "primary re-pressurized RFG". The maximum allowable working pressure within the cycle can be limited only by the lowest maximum allowable working pressure rating and temperature rating of any given pressure containing component positioned within the heater cycle system, as well as by a manufactured burner's design ability to provide stable fuel combustion flame characteristics under a wide range of operating conditions at a given heater internal operating pressure.

The manifold conduit that routes the combined primary re-pressurized RFG from the cycle system FIG. 1 'base configuration' example of two parallel-positioned primary RFG blower or primary RFG compressor means to the heater unit burner assembly contains a downstream side-branch connection with connected atmospheric vent conduit with included flow control means for exhausting a small flow portion of the primary re-pressurized RFG to atmosphere. This atmospheric exhausted small flow portion of the primary re-pressurized RFG constitutes the open portion of the heater cycle system. The atmospheric vented primary re-pressurized RFG mass flow rate is essentially or predominantly equivalent to the mass rate of the formed products of combustion (carbon dioxide and water vapor) within the heater unit's burner assembly, with the atmospheric vented primary re-pressurized RFG mass flow rate varying approximately between 2.9% to 9.7% of the cycle's system respective example 800° F. to 1800° F. HTF mass flow rates shown in Table 1 for varied supply of high temperature heat transfer fluid operating temperatures into a heater unit's one or more contained heat exchanger sections.

In the second embodiment, from the First Embodiment's described heater RFG collection manifold containing recirculated flue gas, having a small degree of superheat temperature and positive gage pressure, the RFG mass flow is directed from the RFG collection manifold into the cycle system FIG. 1 'base configuration' of either one or example two parallel-positioned RFG blower or primary RFG compressor means for re-pressurization and discharge as primary re-pressurized RFG into a manifold connected to one or more burner assemblies contained within the heater unit.

In the heater cycle system example 'base configuration' of two parallel-positioned primary RFG blower or primary RFG compressor means discharging primary re-pressurized RFG into a common manifold connecting to the described heater unit, the common manifold has two end-branch conduits supplying individual respective streams of first primary re-pressurized RFG and second primary re-pressurized RFG to the burner assembly's respective inlet supply connections of the preferred partial-premix sub-assembly and to the tertiary blending zone within each said burner assembly. Both first and second end-branch conduits of primary re-pressurized RFG can contain flow control valve means of damper-type design or other design valve means to maintain a correct distribution of the total primary re-pressurized RFG flow within their respective branch conduits, said first end-branch conduit of primary re-pressurized RFG can further contain temperature, pressure, and mass flow sensor/transmitter means, whereas the second end-branch conduit of primary re-pressurized RFG can further contain temperature and pressure sensor/transmitter means.

Individual additional burner unit inlet supply connections are further provided for flow connectivity to individual separate respective conduits supplying a controlled flow stream of fuel and a controlled low pressure flow stream of predominant oxygen that is supplied by an operating facility's separate air separation system.

The heater cycle system's thermodynamic and thermal efficiency values contained within Table 1 are based on a facility's air separation system supply of a 95% rich oxygen stream, but other higher or lower percentages of rich oxygen streams can be supplied into the heater cycle's system operation. The predominant non-oxygen molecular gas contained within the described example 95% predominant oxygen stream is Argon, with lesser Nitrogen and trace amounts of rare air-extracted gases making up the balance. Alternately, as described later, the predominant oxygen stream provided by the facility's air separation system can be homogeneously blended with a supply of secondary re-pressurized RFG before the controlled flow of continued predominant oxygen supply is conveyed through conduit means connected to the one or more burner assembly means within a heater unit.

A specific burner design is not within the scope or context of the invention's heater cycle system, as burner designs will vary based on the Btu/Hr rating of individual burners, the type of heater, and the burner manufacturers design and operational experience with present art oxy-fuel low emission performance burners.

Adapting a present art burner assembly with partial-premix subassembly configuration means to the heater cycle's system controlled temperature of greatly accelerated fuel combustion can however include the partial-premix subassembly internal division of the first primary re-pressurized RFG stream. In this partial-premix subassembly configuration, a divided first portion of the first primary re-pressurized RFG stream can be employed for homogeneous pre-blending with the fuel stream, and the second portion of the first primary re-pressurized RFG stream can be employed to develop a concentric or cylindrically annular outermost flow of radiant energy absorbing RFG that shrouds the partial-premix sub-assembly's adjacent downstream connected primary combustion flame zone. The primary combustion flame zone can be defined in this partial-premix sub-assembly configuration as a volumetric zone into which homogeneous mixtures of fuel and first portion of first primary re-pressurized RFG and separately emitted predominant oxygen stream enter into combustion chemical reactions.

The fore-described shroud of second portion of the first primary re-pressurized RFG provides the means for both combustion flash radiant heat absorption, and the absorption of molecular specific frequency bands of radiant heat emanating from individual CO.sub.2 and H.sub.2O binary combustion gas product molecules within the developed combustion reaction flames, These common means of radiant heat emissivity and absorption enables combustion heat to be rapidly distributed to and absorbed uniformly at the speed of light rate of 186,000 miles per second by the flame shroud's content of greater mass and lower temperature of identical molecular proportions of binary CO.sub.2 and H.sub.2O molecular gases. It is noted that the infrared heat frequency bands of emissivity and absorption for a specific molecular binary gas are identical The described burner assembly 'base-configuration' can utilize the total controlled mass flow of the combined first and second divided portions of the first primary re-pressurized RFG streams to rapidly produce the cycle desired example resultant controlled example 2400° F. primary combustion zone temperature.

The fore-mentioned second primary re-pressurized RFG stream connected to the burner assembly tertiary blending zone supply connection, supplies the controlled radiant and convective heat absorbing mass flow rate means to blend with the upstream produced primary combustion zone mass flow gases. The tertiary zone mass flow blending of predominantly common binary radiant and convective molecular streams rapidly accelerates the lowering of the example 2400° F. primary zone combustion gases and the raising of the second primary re-pressurized RFG mass flow stream to their resulting combined desired set-point operating equilibrium temperature. These two described combined mass flow streams of superheated common molecular gases, having a common established equilibrium temperature, constitute the source and mass flow rate of the cycle system's fore-mentioned highly superheated temperature heat transfer fluid that is flow-directed from the heater unit burner assembly into the connected downstream heat exchanger means comprising either one or more series-positioned heat exchanger sections or two or more parallel-positioned heat exchanger sections.

The First Embodiment's cycle described heater unit exhausted HTF as comprising a continuous superheated vapor mixture of predominant carbon dioxide and water vapor in identical Mol percent ratio proportions as these molecular combustion product components are produced from the combustion of the employed gaseous or liquid fuel, and additionally described from the Second Embodiment cited HTF as comprising the combined mass flows of burner primary combustion zone gases and second branch-stream of primary re-pressurized RFG introduced into the burner assembly tertiary zone, the HTF flow at selected operating temperature can be directly connected or conduct-connected to the heater unit's downstream-positioned inlet plenum of one heat exchanger series-positioned section or two or more inlet plenum of two or more heat exchanger parallel-positioned sections.

The heater cycle's steady-state molecular gaseous components contained within the heater unit HTF further comprises a controlled percentage of excess oxygen and small Mol percents amounts of argon, lesser nitrogen and ppmv amounts of rare gases normally present in atmospheric air. All of the heater cycle's HTF molecular components Mol % are considered within the process simulation calculated data contained within the Table 1 sample operating conditions. During a heater's initial steady-state operation, the non-oxygen gases (within the supplied example 95% predominant oxygen stream from a separate air separation facility) slowly increases in mass flow rate within the HTF during the first approximate 2 to 3 hours of steady-state operation, at which time the mass flow rate of these non-oxygen gases entering the heater cycle within the predominant 95% oxygen stream are in equilibrium with the mass flow rate of these same gases being exhausted within the fore-described quantity of primary re-pressurized RFG that is vented to atmosphere as the partially-open portion of the heater cycle system. The exhausted HTF within the example 1300° F. HTF heater cycle's steady-state operation approximately contains less than 5.6% of the nitrogen mass flow that is typically contained within an equivalent Btu/Hr rated air/fuel fired heater of current low-NO.sub.x design and having HTF or exhausted flue gas containing 6% excess oxygen.

The HTF gases enter a heat exchanger section within a heater unit at high superheated temperatures and exhausts at lower superheated temperatures. The controlled HTF temperature entering the heat exchanger section is established as typically being not less than 50° F. greater than the highest required temperature of steam or process fluid stream that exits the highest temperature operating fluid heating coil or tube section header contained within the heat exchanger section. The heat exchanger section is normally constructed for a conventional one-pass axial flow of HTF through each heat exchanger section. Within the fore-mentioned heater cycle system configured example FIG. 1 'base configuration', the heat exchanger section contains one series-positioned set of heating coils or tubes, although two or more series-positioned separate heating coils can also be installed in the example heat exchanger section. In process heating applications where more than one process flow fluid stream is required to be heated to a high temperature that is within a 50° F. example temperature of the given temperature of the HTF entering the heat exchanger, the heat exchanger section means can alternately be configured with the two or more parallel-positioned heat exchanger sections as shown in the example FIG. 2 'alternate configuration'. Each heat exchanger section is constructed with suitable high temperature interior-mounted metal tubes or coils, either of bare-surface type or finned-tube type, for the desired HTF heat transfer duty to the supplied circulated liquids or gases contained within the tubes or coils.

As shown in Table 1 for methane gas fuel combustion, between the invention cycle HTF example operating supply temperatures of 800° F. to 1800° F. to the heat exchanger section, the heater cycle system's thermal efficiencies range between 127.06 percent and 124.46 percent when the heater's common heat exchanger section HTF low discharge outlet temperature is 300° F. and the primary re-pressurized RFG temperature is 315° F. The heat exchanger section HTF low discharge outlet temperature, or RFG, can be controlled to approximately 400° F. to 450° F. without significant changes in thermal efficiencies when liquid fuels are employed and temperatures higher than 300° F. are deemed to be advantageous to avoid possible corrosion within the low temperature portion of the partially-open heater cycle system.

TABLE 1

Heater Re-circulated Flue Gas (RFG) & Heat Transfer Fluid (HTF) Cycle Properties

| Burner RFG Supply Temperature (° F.) | Exchanger HTF Inlet Temperature (° F.) | Exchanger HTF Outlet Temperature (° F.) | HTF Differential Enthalpy (Btu/lb.) | Exchanger HTF Mass Flow (Lb./minute) | Exchanger Heat Transfer (MMBtu/Hr) | Heater Thermal Efficiency (%*) |
|---|---|---|---|---|---|---|
| 315 | 800 | 300 | 156.28 | 1334.2 | 12.706 | 127.06 |
| 315 | 1050 | 300 | 243.58 | 856.95 | 12.524 | 125.24 |
| 315 | 1300 | 300 | 332.2 | 625.36 | 12.464 | 124.64 |
| 315 | 1550 | 300 | 415.16 | 487.90 | 12.446 | 124.46 |
| 315 | 1800 | 300 | 524.94 | 396.43 | 12.486 | 124.86 |

*10 million LHV Btu/Hr. burner heat rate; 166,666 LHV Btu/Min, 0.4830 Mol/minute methane gas fuel rate, without calculated radiation losses for a specific insulated heater cycle equipment design.

From the Second Embodiment's described portion of the partially-open heater cycle system, the HTF flow is exhausted from the heat exchanger section with subsequent RFG flow connection to the RFG collection manifold at a small degree of superheat temperature and a positive gauge pressure. The RFG collection manifold is end-connected downstream to the inlet of the heater cycle example FIG. 1 'base configuration' of either one series-positioned or two parallel-positioned primary RFG blower or primary RFG compressor.

Figure 2:
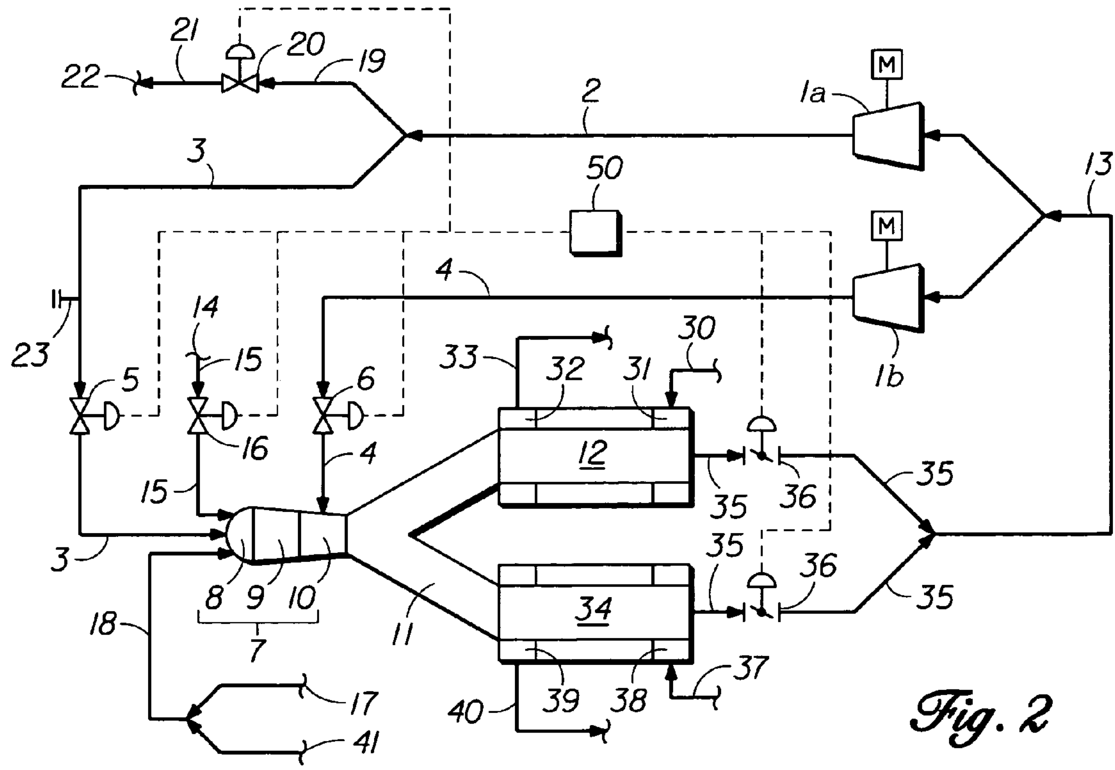
FIG. 2 is a schematic flow diagram of the invention's partially-open heater cycle system comprising example 'base configuration' common components and one example 'alternate configuration' auxiliary component means for providing optimum precise temperature control of primary combustion zone gases and heat transfer fluid, as well as one added example of process required heat transfer from the heat transfer fluid to two or more parallel-positioned heat exchanger sections within the heater unit heat exchanger means.

In a heater cycle system example FIG. 2 'alternate configuration' of the RFG collection manifold being end-connected downstream to two parallel-positioned primary RFG blowers or primary RFG compressors, the first primary RFG blower or first primary RFG compressor discharges its first primary re-pressurized RFG stream into its individual separate conduit means that is end-connected to the downstream burner assembly inlet connection that supplies RFG to its partial-premix subassembly. When more than one burner is incorporated into a heater unit, the first primary RFG blower or first primary RFG compressor discharges its first primary re-pressurized RFG stream into its individual separate conduit means that is end-branch parallel-connected to two or more burner assembly inlet connections that receives RFG into its respective partial-premix subassembly. The second primary RFG blower or second primary RFG compressor discharges its second primary re-pressurized RFG stream into its individual separate conduit means that is end-connected to the downstream burner assembly inlet connection that receives RFG into its tertiary blending zone. When more than one burner is incorporated into a heater unit, the second primary RFG blower or second primary RFG compressor discharges its second primary re-pressurized RFG stream into its individual separate conduit means that is end-branch parallel-connected to two or more burner assembly inlet connections that receives RFG into its respective tertiary blending zone.

The described heater cycle system example FIG. 2 'alternate configuration' employment of first and second primary RFG blowers or first and second primary compressor can be applied in applications where speed control of the individual said blowers or compressors provides a required more precise flow control of the individual primary first and second re-pressurized RFG flow streams to the burner partial-premix subassembly and burner tertiary blending zone inlet connections than can be solely achieved with flow control valve means positioned within the first and second branch conduits of primary re-pressurized RFG as described in the Second Embodiment's heater cycle example FIG. 1 'base configuration'. The purpose of any provided primary re-pressurized RFG flow control means is to provide the appropriate primary re-pressurized RFG individual stream mass flow to achieve stable combustion and maximum precise temperature control within a given designed burner assembly primary combustion zone and tertiary blending zone during varied employed fuel and range of heater output rated operating conditions.

From the Second Embodiment's heater cycle system described burner assembly having separate supply inlet connections for connection to conduits supplying a controlled flow stream of fuel and a controlled flow stream of predominant oxygen supplied by an operating facility's separate air separation system. The heater cycle system example FIG. 1 'alternate configuration' of predominant oxygen stream is initially provided by a facility's separate air separation system and thereafter is homogeneously blended with a controlled supply of secondary re-pressurized RFG before the controlled flow of continued predominant oxygen supply is conveyed through conduit means connected to one or more burner assembly within a heater unit. In this heater cycle example FIG. 1 'alternate configuration' of predominant oxygen stream, a portion of the mass flow of primary re-pressurized RFG is extracted from a side branch connection on a primary RFG blower or primary RFG compressor discharge manifold connected to the downstream positioned one or more burners provided in the heater unit. The side-branch connection supplies a small portion of the primary re-pressurized RFG to the inlet of a small modular-constructed secondary RFG blower or compressor. The secondary RFG blower or compressor increases the pressure of the discharged mass flow of primary re-pressurized RFG (now referred to as secondary re-pressurized RFG) to a pressure level that can range between 2 psi and 35 psi greater than a heater unit's internal burner assembly absolute pressure level. The stream of higher pressure and after-cooled superheated secondary re-pressurized RFG is conduit routed to a venturi or other style of gas blender. Within the gas blender, the supplied stream of secondary re-pressurized RFG is homogeneously blended with a lesser-pressurized and highly rich oxygen stream supplied by a facility's separate air separation system. The resulting homogeneously continued oxygen predominant blended mixture of secondary re-pressurized RFG stream and highly rich oxygen stream is conduit routed to the one or more burner assembly containing one or more partial-premix subassembly at a blended mix temperature that is above the gas mixture dew point temperature.

This described heater cycle example FIG. 1 'alternate configuration' of predominant oxygen can be applied to satisfy possible prevailing governmental authority safety codes, whereby the secondary re-pressurized RFG stream's Mol content percents of combined carbon dioxide and water vapor within the blended mixture acts as a chemical reaction suppressant to potential self-ignition of carbon-content foreign material that can inadvertently be present within the assembled conduit that supplies the stream of predominant oxygen to the one or more burner assemblies of preferred partial-premix design.

From the Third Embodiment's cycle described HTF gases entering a heat exchanger section at high superheated temperatures and exhausting with lower superheated temperatures, the heat exchanger section is typically constructed for an axial one-pass flow of HTF through each heat exchanger section.

In a heater cycle system example FIG. 2 'alternate configuration' for process heating applications where a heater unit is required to heat more than one process fluid flow stream to a high temperature that is within an approximate 50° F. example temperature of the given highly superheated HTF, two or more parallel-positioned heat exchanger sections can be provided. Each heat exchanger section receives a controlled flow portion of combined and then manifold-divided high superheated HTF mass flow emanating from one or more burner assemblies contained within a heater unit to satisfy each heat exchanger section's heat duty service. The HTF mass flow directed in one-pass flow through each parallel-positioned heat exchanger section is controlled by a damper valve positioned within each heat exchanger section's reduced temperature HTF discharge plenum-connected branch manifold, thereby enabling a long operating life for the low operating temperature and low cost damper-type control valve means. The reduced temperature controlled-flow HTF gases discharged from each parallel-positioned heat exchanger section, said discharged HTF gases now referred to in the heater cycle system as "re-circulated flue gas" or "RFG", are combined together at a positive gauge pressure and a temperature greater than the RFG dew point temperature and conveyed into the adjacent downstream-positioned RFG collection manifold.

With the partially open heater cycle system described herein, provided fuel combustion means are susceptible to a greater than 95% to 98% reduction of NO.sub.x that occur within current art 10 ppmv to 25 ppmv Low-NO.sub.x heaters. This reduction in NO.sub.x is achieved in Table 1 operating conditions with both the controlled example 2400° F. combustion zone temperature and from a reduction of combustion zone nitrogen to a low 0.0562 Mol fraction level (at the example 1300° F. HTF temperature condition with 3% excess oxygen) of the nitrogen mass rate contained within equally heat-rated current art low-NOx air/methane heaters with 106% stoichiometric air combustion. The invention's low emissions are further achieved from the cycle's enhanced combustion temperature control means that maintains combustion temperatures substantially below the temperatures at which N.sub.2 and CO.sub.2 may enter into completed endothermic chemical reactions with NO.sub.x and CO end products.

The invention's heater cycle thermal efficiency developed from combustion means and chemical reaction events for suppressing fugitive emissions is derived from the following collective heater cycle system re-circulated flue gas and heat transfer fluid molecular composition and heat transfer fluid attributes:

(a) The heater RFG and HTF of this invention's heater cycle system comprises a continuous superheated mixture of predominant carbon dioxide and water vapor in identical Mol percent ratio proportions as these molecular components are produced from the combustion of a given fuel. For example, in the case of 50% methane/50% carbon dioxide landfill gas, the RFG contains a 1:1 ratio of 2 Mol carbon dioxide to 2 Mols water vapor in identical proportion to the products of stoichiometric oxygen combustion. The chemical reaction equation can be described as follows:

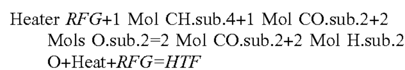

Heater *RFG*+1 Mol CH.sub.4+1 Mol CO.sub.2+2 Mols O.sub.2=2 Mol CO.sub.2+2 Mol H.sub.2 O+Heat+*RFG=HTF*

In the example of methane gas fuel, the RFG composition contains a ratio of 1 Mol CO.sub.2 to 2 Mols H.sub.2 O in identical proportion to the products of 103% stiochiometric oxygen combustion of methane fuel within the chemical reaction equation of:

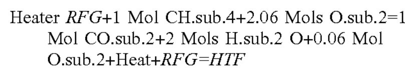

Heater *RFG*+1 Mol CH.sub.4+2.06 Mols O.sub.2=1 Mol CO.sub.2+2 Mols H.sub.2 O+0.06 Mol O.sub.2+Heat+*RFG=HTF*

(b) The invention heater cycle system of RFG and HTF of highly predominant binary gaseous molecules provides the replacement mass flow means to the conventional art open-type heater system's predominant diatomic non-emissive and non-radiant energy absorbing molecular nitrogen heat transfer fluid. The invention heater cycle system RFG and HTF replacement to nitrogen contains both predominant water vapor radiant and convective capable binary molecules with a mass ratio of atomic weights of (16/2)=8 and carbon dioxide radiant and convective capable binary molecules with a mass ratio of atomic weights of (32/12)=2.66, which denotes their susceptibility to high radiant energy emissivity and absorption. This compares to the nitrogen's mass ratio 14/14=1 which denotes nitrogen's minimal, if any, emissive and radiant energy absorbing abilities at any temperature.

(c) Compared to conventional air/methane combustion means, the invention's heater cycle molecular composition of first primary re-pressurized RFG (at example high temperature 1300° F. HTF operating condition) provides the means for a burner primary combustion zone chamber to contain a 587% increase in binary molecular mass means that enables fuel/oxidation exothermic chemical combustion reactions to be carried forth without developing unacceptable high combustion gas temperatures. Wherein combustion products comprise highly superheated binary carbon dioxide and binary water vapor molecules that emissively radiates their combustion infrared heat energy in their individual molecular infrared spectral ranges at the speed of light (186,000 miles a second), the combustion chamber's 587% increase in first primary re-pressurized RFG supplied binary carbon dioxide and binary water vapor molecules (of very lower superheat temperature and identical molecular-specific infrared spectral bands of heat absorption) provides the means by which heat of combustion is absorbed within the primary combustion zone chamber at the same highly accelerated rate of 186,000 miles per second.

(d) The invention's heater cycle system RFG and HTF common molecular thermodynamic property characteristics are able to absorb or emanate 42% greater thermal energy per pound of mass per degree Fahrenheit temperature change than is present within a conventional art heater's predominant air supported combustion and predominant nitrogen heat transfer gas stream.

(e) The Second Embodiment described burner manufacturer's configuration of a preferred partial-premix subassembly can provide the means for homogeneous blending, wherein a first divided portion or total portion of first primary re-pressurized RFG and fuel stream are homogeneously blended together to a degree proportional to the square of each flowing velocity as they meet. This combined stream can then be subsequently homogeneously blended with the predominant oxygen stream within the immediate partial-premix sub-assembly discharge nozzle's interfaced volumetric space connecting with the adjacent downstream primary combustion zone and ignition means.

(f) The gaseous fuel stream also comprises binary molecules of high susceptibility to high radiant energy absorption and emissivity, such as methane with a mass ratio of atomic weights of (16/4)=4, ethane with a mass ratio of atomic weights of (24/4)=6, propane with a mass ratio of atomic weights of (36/8)=4.5, etc.

(g) The supplied controlled total mass flow of first primary re-pressurized RFG (of significantly greater mass and lower superheat temperature) within and surrounding the primary combustion flame zone therein predominantly absorbs the released heat of combustion emitted at the extremely rapid rate of 186,000 miles per second. The initially formed primary combustion zone product gases are decreased in temperature from conventional highly elevated gas molecular temperatures above approximately 3300° F. for the example methane fuel adiabatic combustion flame temperatures to the example preferred controlled temperature of 2400° F. or less and thereby creating an inadequate time period for completed chemical disassociation reactions to take place which produce carbon monoxide, or other chemical reactions which produce nitrogen dioxide at temperatures above 2600° F. to 2900° F.

(h) The subsequent heater unit burner assembly tertiary zone supplied controlled-flow of superheated second primary re-pressurized RFG stream (of significantly greater mass and lower superheat temperature) downstream of a preferred 2400° F. primary combustion zone, results in a rapid establishment of the desired high temperature heat transfer fluid equilibrium example temperatures of 800° F. to 1800° F. This rapid establishment of the selected HTF equilibrium temperature is due to the combined gaseous convective heat transfer and the 186,000 miles per second rate of infrared radiant heat transfer between the two mixing streams of common individual molecular constituents having their individual infrared frequency band range means of high radiant energy absorption and emissivity.

(i) In the case of liquid fuel injected heater units, the atomized injected fuel's binary molecules of high susceptibility to high radiant energy absorption and emissivity are rapidly vaporized and the combustion is highly accelerated by the greatly predominant binary mass of heat radiant gaseous molecules present within the burner's primary combustion zone. Extremely difficult to combust hydrocarbons present within various liquid fuels are conventionally exhausted to atmosphere as unburned hydrocarbon and carbon monoxide gases. Whereas the invention's heater cycle system combustion process provides the infrared radiant energy means for extremely rapid combustion of hydrocarbons. Especially difficult combustible hydrocarbons, appearing as non-combusted hydrocarbons within the heater unit HTF exhaust and RFG within the RFG collection manifold, will have predominant RFG mass flow repeated re-circulated exposure to subsequent combustion cycle processes within the heater burner assembly to achieve final complete combustion. With the liquid fuel employment, only the small percentage of primary re-pressurized RFG vented to atmosphere has the potential of emitting contained small quantities of unburned hydrocarbons into the atmosphere.

B. Description of Preferred Embodiment

Referring now more particularly to FIG. 1, the heater cycle system is hereafter described with its 'base configuration' comprising common employed cycle components, as well as a 'alternate configuration' component means that can be alternately incorporated with the 'base configuration' heater cycle system components.

The invention's cycle 'base configuration' re-circulated flue gas stream contained within RFG collection manifold 13 can be supplied to either one blower unit or compressor unit 1*a* or to two or more blower units or compressor units positioned in parallel (as shown by the FIG. 1 with example of 1*a* and 1*b* blower units or compressor units) to re-pressurize and discharge the heater re-circulated flue gas into a single common primary re-pressurized RFG conduit manifold 2. Primary re-pressurized RFG conduit manifold 2 comprises parallel end-branch conduit means 3 and 4. Conduit 3 can contain flow control valve means 5 for the end-connected transfer of the controlled flow first stream of primary re-pressurized RFG to a preferred partial-premix subassembly 8 contained within burner assembly 7 or two or more parallel-positioned preferred partial-premix subassembly 8 of smaller size contained within burner assembly 7. Conduit 3 can further contain sensor-transmitter means for temperature, pressure, and RFG mass flow with conduit 3.

The parallel end-branch conduit means 4 can contain flow control valve means 6 for the conduit end-connected transfer of the controlled flow of second stream of primary re-pressurized RFG into the tertiary blending zone 10 contained within burner assembly 7. Conduit means 4 can further contain sensor-transmitter means for temperature, pressure, and RFG mass flow within conduit 4.

A pressurized stream of fuel is supplied from source 14 into conduit 15 containing flow control valve 16, with said conduit having end-connectivity to a preferred downstream partial-premix subassembly 8 contained within burner assembly 7 or to two or more parallel-positioned preferred partial-premix subassemblies 8 of smaller size contained within burner assembly 7. Conduit 15 can further contain sensor-transmitter means for temperature, pressure, and RFG mass flow within conduit 15.

A controlled stream flow of pressurized predominant oxygen is supplied from facility remote source 17 into conduit 18 having end-connectivity to either one preferred partial-premix subassembly 8 contained within burner assembly 7 or to two or more parallel-positioned preferred partial-premix subassemblies 8 of smaller size contained within burner assembly 7.

Within partial-premix subassembly 8, the identified conduits 3, 15, and 18 respectively supplied stream flows of first stream of primary re-pressurized RFG, fuel, and predominant oxygen are therein blended for following downstream ignition and controlled temperature combustion within the temperature sensor-transmitter monitored primary combustion zone 9 within burner assembly 7.

Within burner assembly 7, the predominant mass flow of combined products of fuel combustion, first stream of primary re-pressurized RFG, and excess oxygen flows from the primary combustion zone 9 at a high superheated temperature into the downstream tertiary blending zone 10 wherein these said gases are blended with the fore-described conduit 4 supplied controlled mass flow of second stream of primary re-pressurized RFG of lower superheated temperature.

The combined gases mass flows entering the tertiary blending zone 10 within burner assembly 7 produces a resultant selected equilibrium temperature and mass flow rate of heat transfer fluid that is directed from the burner assembly 7 through conduit or flow transition means 11 with temperature-transmitter sensor means into the heater unit's heat exchanger section 12. The heat energy contained within the HTF entering heat exchanger section 12 is transferred to process fluids or facility steam system fluids supplied within remote source conduit 30 at low temperature to heat exchanger section header 31 and discharges at a higher temperature from heat exchanger section header 32 into a facility return conduit 33.

The heat transfer fluid stream is exhausted from the heater unit's heat exchanger section (exhausted HTF hereafter in the cycle fluid flow being referred to as "recycled flue gas" or "RFG") with flow connectivity into downstream-positioned RFG collection manifold 13 containing sensor-transmitter means for temperature, pressure, oxygen percent, and RFG mass flow, thereby completing the closed portion of the partially-open heater cycle system.

Primary re-pressurized RFG conduit manifold 2 supplies the heater cycle steady-state condition excess primary re-pressurized RFG into side-stream conduit 19 containing RFG vent control valve means 20 that discharges cycle excess RFG into conduit 21 that can contain mass flow meter-transmitter means, temperature and pressure sensor-transmitter devices. The cycle's excess RFG is vented from conduit 21 into atmosphere at 22 to complete the open portion of the partially-open heater cycle system.

An 'alternate configuration' heater cycle employment of primary re-pressurized RFG utilizes alternate auxiliary second side-branch connection 23 on primary re-pressurized RFG conduct manifold 3 to supply primary re-pressurized RFG into connected conduit 24 that can contain flow control valve means 25 and with said conduit having connectivity to the inlet of auxiliary alternative secondary RFG blower or RFG compressor unit 26.

Secondary RFG blower or RFG compressor unit 26 discharges a secondary further re-pressurized stream of RFG into conduit 27 having end-connectivity with venturi type blender or other blending type means 28 with incorporated controlled side-stream flow of alternative supplied lower pressure predominant oxygen supplied from a facility remote source 17. The homogeneous blended mixture of gases contained within conduct stream 27 and conduit stream 17 discharges from gas blending means 28 as a continued predominant oxygen stream into conduit 29 with end-connectivity to 'base configuration' predominant oxygen supply conduit 18.

Referring now more particularly to FIG. 2, the heater cycle system is herein described with its 'base configuration' comprising common employed cycle components described in FIG. 1, as well as 'alternate configuration' component means that can be alternately incorporated with the 'base configuration' heater cycle system components to achieve alternative operational and process heating requirements.

The 'base configuration' example re-circulated flue gas blower unit or compressor unit 1*a* and 1*b* of FIG. 1 is altered in functionality wherein the RFG blower unit or compressor unit 1*a* and 1*b* individually operates in parallel for discharge of primary re-pressurized RFG into their respective individual separate discharge primary re-pressurized RFG manifold conduit means 2 and primary re-pressurized RFG conduit 4. Primary re-pressurized RFG manifold conduct 2 contains parallel first and second end-branch conduit means with first end-branch conduit means 19 containing RFG vent control valve means 20 that discharges cycle excess RFG into conduit 21 that can contain mass flow meter-transmitter means, temperature and pressure sensor-transmitter devices. The cycle's excess RFG is vented from conduit 21 into atmosphere at 22 to complete the open portion of the partially-open portion heater cycle system. Second end-branch conduit 3 therein contains side-branch auxiliary alternate connection 23 and control valve means 5 for conveying a controlled stream of primary re-pressurized RFG to either one preferred partial-premix subassembly 8 contained within burner assembly 7 or two or more parallel-positioned preferred partial-premix subassemblies 8 of smaller size contained within burner assembly 7. Conduit 3 can further contain sensor-transmitter means for temperature, pressure, and RFG mass flow within conduit 3.

Conduit 4 contains sensor-transmitter means for temperature, pressure, and can included control valve means 6 for the end-connected conduit controlled flow transfer of the second stream primary re-pressurized RFG stream to the downstream tertiary blending zone 10 contained within burner assembly 7.

A pressurized stream of fuel is supplied from source 14 into conduit 15 containing sensor-transmitter means for temperature, pressure, mass flow, and fuel flow control valve means 16, with said conduit having end-connectivity to either one preferred downstream partial-premix subassembly 8 contained within burner assembly 7 or two or more parallel-positioned preferred partial-premix subassembly 8 of smaller size contained within burner assembly 7.

A controlled stream flow of pressurized predominant oxygen is supplied from facility remote source 17, or alternate remote standby supply source 41 into conduit 18 having end-connectivity to either one preferred partial-premix subassembly 8 contained within burner assembly 7 or two or more parallel-positioned preferred partial-premix subassemblies 8 of smaller size contained within burner assembly 7.

Within partial-premix subassembly 8, the said identified conduits 3, 15, and 18 respectively supplied stream flows of first stream of primary re-pressurized RFG, fuel, and predominant oxygen are therein blended for following downstream ignition and controlled temperature combustion within the temperature sensor-transmitter monitored primary combustion zone 9 within burner assembly 7.

Within burner assembly 7, the predominant mass flow of combined products of fuel combustion, first stream of primary re-pressurized RFG, and excess oxygen flows from the primary combustion zone 9 at a high superheated temperature. These zone 9 cited discharged gases then flow into the downstream tertiary blending zone 10 wherein these gases are blended with the fore-described conduit 4 supplied controlled mass flow of second stream primary re-pressurized RFG of lower superheated temperature. The combined gases mass flows entering the tertiary blending zone 10 within burner assembly 7 produce a resultant selected equilibrium temperature and mass flow rate of heat transfer fluid that is directed from the burner assembly 7 through conduit manifold means 11 with temperature sensor-transmitter means and having parallel end-branch connectivity to example parallel-positioned heat exchanger section 12 and 34. The heat energy contained within the high temperature HTF entering heat exchanger section 12 is transferred to process fluids or facility steam system fluids supplied within remote source conduit 30 at low temperature to heat exchanger section header 31 and discharges at a higher temperature from heat exchanger section header 32 into facility return conduit 33. The heat energy contained within the HTF entering heat exchanger section 34 is transferred to process fluids or facility steam system fluids supplied within remote source conduit 37 at low temperature to heat exchanger section header 38 and discharges at a higher temperature from heat exchanger section header 39 into facility return conduit 40.

The low temperature HTF stream exhausts from the heater unit's individual parallel-positioned heat exchanger sections (said exhausted HTF hereafter referred to as "recirculated flue gas" or "RFG") with temperature monitored flow and connectivity through RFG parallel end-branch manifold conduit means 35 containing RFG flow proportioning damper valve means 36. RFG parallel end-branch manifold conduit means 35 connects to RFG collection manifold 13 containing sensor-transmitter means for temperature, pressure, oxygen percent, and mass flow, thereby completing the closed portion of the partially-open heater cycle system.

Figure 3:
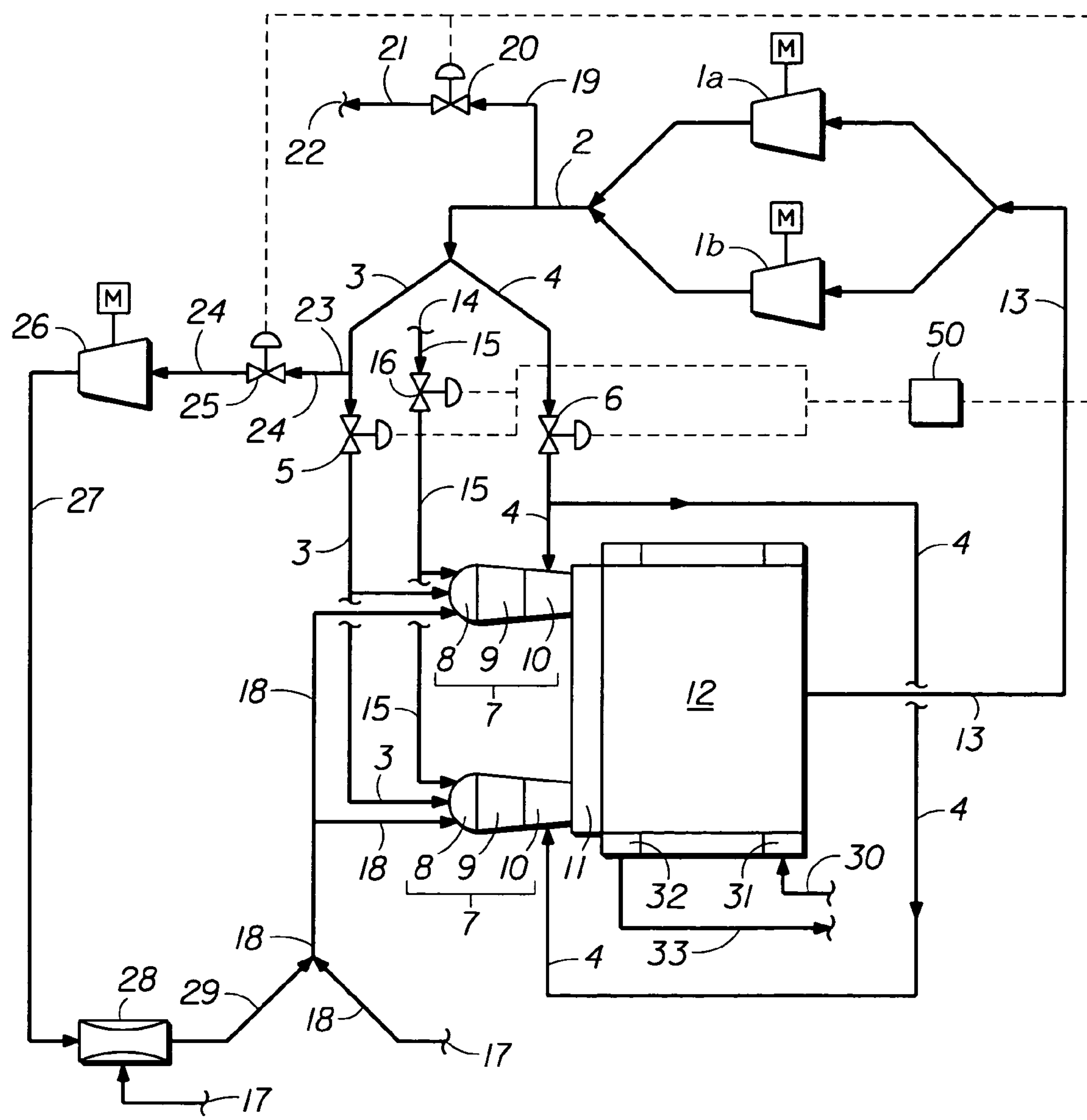
FIG. 3 is a schematic flow diagram of the invention's partially-open heater cycle system comprising the FIG. 1 diagram version of the heater unit with more than one (an example quantity of two) parallel-connected burner assembly as described within the invention's presented Fourth and Fifth Embodiments.
Figure 4:
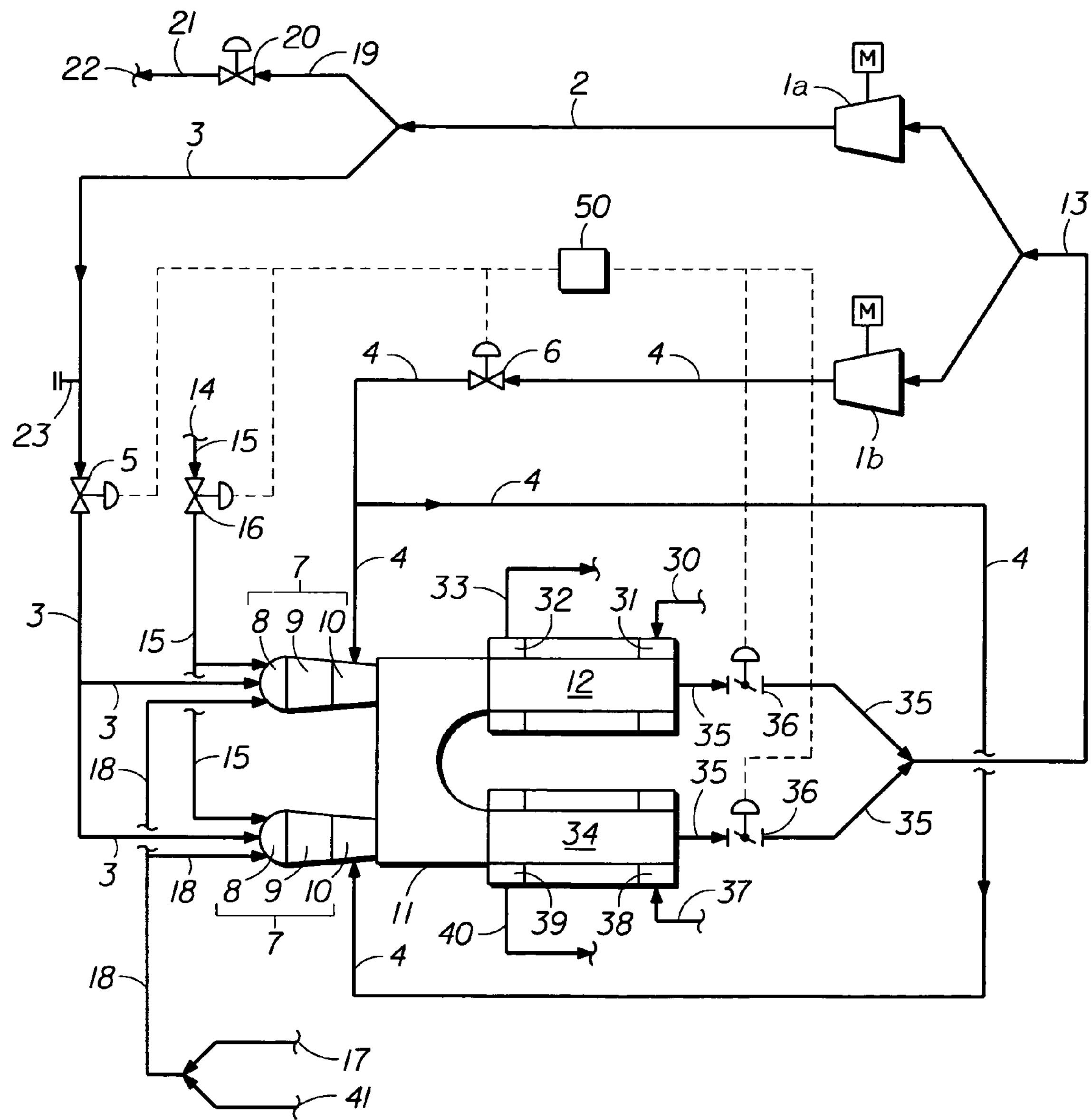
FIG. 4 is a schematic flow diagram of the invention's partially-open heater cycle system comprising the FIG. 2 diagram version of the heater unit with more than one (an example quantity of two) parallel-connected burner assembly as described within the invention's presented Fourth and Fifth Embodiments.

Referring now more particularly to FIG. 3 and FIG. 4, the heater cycle system is hereafter continued as described as for FIG. 1 and FIG. 2, with the alternative configuration or variation of: (a) the transfer of the controlled flow of second stream of primary re-pressurized RFG from control valve 6 into conduit 4 comprising downstream parallel branch conduit ends, each end connected to the tertiary blending zone 10 contained within each downstream-connected burner 7, (b) the transfer of the controlled stream flow of pressurized predominant oxygen from a remote facility source 17 into conduit 18 comprising downstream parallel branch conduit ends, each end having downstream end-connectivity to either one preferred partial-premix subassembly 8 contained within each parallel-positioned burner assembly 7 or to two or more parallel-positioned preferred partial-premix subassemblies 8 of smaller size contained within each burner assembly 7, (c) the transfer of the controlled flow of fuel from flow control valve 16 into conduit 15 comprising downstream parallel branch conduit ends, each conduit end having downstream end-connectivity to either one preferred partial-premix subassembly 8 contained within each parallel-positioned burner assembly 7 or to two or more parallel-positioned preferred partial-premix subassemblies 8 of smaller size contained within each burner assembly 7, and (d) the transfer of the controlled flow of first stream of primary re-pressurized RFG from flow control valve 5 into conduit 3 comprising downstream parallel branch conduit ends, each conduit end having downstream end-connectivity to either one preferred partial-premix subassembly 8 contained within each parallel-positioned burner assembly 7 or to two or more parallel-positioned preferred partial-premix subassemblies 8 of smaller size contained within each burner assembly 7. In FIG. 3, each burner assembly exhaust outlet means is directly connected to a common conduit or flow transition means 11 with outlet-connection to the heater unit's heat exchanger section 12. In FIG. 4, each burner assembly exhaust outlet means is directly connected to a common conduit or flow transition means 11 having parallel outlet-connections directly-connected to the heater unit's individual parallel-positioned heat exchanger section 12 and 34.

While this invention has been described in its preferred embodiments, it is appreciated that variations may be made without departing from the scope and spirit of the invention.

It should be apparent from the foregoing that an invention having significant advantages has been provided. While the invention is shown in only a few of its forms, it is not just limited but is susceptible to various changes and modifications without departing from the spirit thereof.

I claim:

1. A method for heating a process fluid or gas using a partially-open heat regenerative oxygen-fuel fired heater cycle system with low fugitive heater flue gas exhaust emissions exclusively using liquid or gaseous hydrocarbon fuel, the method comprising:

(a) providing a first burner assembly for mixing and combusting controlled streams of a liquid or gaseous hydrocarbon fuel, a pressurized predominate oxygen mixture, and a first recirculated flue gas, the burner assembly including, (1) inlet supply connections providing connectivity to the controlled streams of the fuel, predominate oxygen mixture, and first recirculated flue gas, (2) a partial premixer in communication with the inlet supply connections for mixing the controlled streams of the fuel, predominate oxygen mixture, and first recirculated flue gas, the first recirculated flue gas stream comprised predominately of carbon dioxide and water vapor, (3) a primary ignition and combustion zone connected to and downstream of the partial premixer for combusting the controlled streams of the fuel and predominate oxygen mixture resulting in a stream of gases in a superheated state comprised predominately of carbon dioxide and water vapor, (4) a tertiary blending zone for combining the steams of superheated gases and exhausting a flue gas, the tertiary blending zone connected to and positioned downstream of the primary ignition and combustion zone and configured to accept a source of a second recirculated flue gas, the second recirculated flue gas stream comprised predominately of carbon dioxide and water vapor;

(b) providing a second burner assembly in parallel with the first burner assembly;

(c) passing the flue gas through a flow transition, having two ends, one end in communication with and downstream of the burner assemblies and the other end connected to a heat exchanger;

(d) passing the flue gas through a heat exchanger connected to and downstream of the flow transition, the heat exchanger configured to accept the flue gas from the tertiary blending zone and transfer heat energy of the flue gas to a process fluid or gas passed through the heat exchanger;

(e) compressing and recirculating by at least one compressor or blower the flue gas exhausted from the heat exchanger through a first conduit to a second conduit;

(f) selecting and supplying a first portion of the recirculated flue gas in the second conduit to an exhaust to atmosphere;

(g) selecting and supplying a second portion of the recirculated flue gas in the second conduit, the first recirculated flue gas stream, to an inlet supply connection connected to the partial premixer of the burner assembly, (h) selecting and supplying a third portion of the recirculated flue gas in the second conduit, the second recirculated flue gas stream, to the tertiary blending zone of the burner assembly;

(i) supplying from a source the stream of liquid or gaseous hydrocarbon fuel and providing the fuel to an inlet supply connection connected to the partial premixer of the burner assembly;

(j) supplying from a source the predominate pressurized oxygen mixture and providing the predominate pressurized oxygen gas mixture to an inlet supply connection connected to the partial premixer of the burner assembly; and (k) controlling the system to maintain the flue gases in a cycle-continuous superheated state.

2. The method of claim 1 wherein the means for controlling the system of step 16(*j*) is a computer.

3. The method of claim 1 wherein the flue gas is passed through two heat exchangers connected to and downstream of the flow transition.

4. The method of claim 1 wherein the pressurized predominate oxygen mixture is blended by a venturi-type blender with a portion of the recirculated flue gas from the second conduit before the mixture is supplied to the inlet supply connection connected to the partial premixer.

5. The method of claim 1 wherein the controlling step 16(*k*) optimizes the rate of heat transferred to the process fluid or gas in the heat exchanger relative to the mass flow of the liquid or gaseous hydrocarbon fuel.

6. A partially-open heat regenerative oxygen-fuel fired heater cycle system developing low fugitive heater flue gas exhaust emissions during the system heating of a process liquid or gaseous fluid, the system comprising:

(a) a first burner assembly for mixing and combusting controlled streams of a liquid or gaseous hydrocarbon fuel, a pressurized predominate oxygen gas mixture, and first and second recirculated flue gases, the burner assembly including, (1) inlet supply connections providing connectivity to the controlled streams of the fuel, predominate oxygen mixture, and first recirculated flue gas, (2) a partial premixer in communication with the inlet supply connections for mixing the controlled streams of the fuel, predominate oxygen gas mixture, and first recirculated flue gas, the first recirculated flue gas stream comprised predominately of carbon dioxide and water vapor binary radiant and convective molecular gases, (3) a primary ignition and combustion zone connected to and downstream of the partial premixer for combusting the controlled streams of the fuel and predominate oxygen mixture resulting in a stream of gases in a superheated state comprised predominately of carbon dioxide and water vapor binary gases, (4) a tertiary blending zone for combining the streams of superheated gases and exhausting a flue gas, the tertiary blending zone connected to and positioned downstream of the primary ignition and combustion zone and configured to accept the second recirculated flue gas steam, the second recirculated flue gas stream comprised predominately of carbon dioxide and water vapor binary gases;

(b) a flow transition in communication with and downstream of the burner assembly;

(c) a first heat exchanger connected to and downstream of the flow transition, the first heat exchanger configured to accept a first portion of the flue gas exhausted from the tertiary blending zone and transfer heat energy of the flue gas to a first process liquid or gaseous fluid passed through the first heat exchanger;

(d) a second heat exchanger connected to and downstream of the flow transition, the second heat exchanger configured to accept a second portion of the flue gas exhausted from the tertiary blending zone and transfer heat energy of the flue gas to a second process liquid or gaseous fluid passed through the second heat exchanger;

(e) a first conduit in communication with and connected to the first and second heat exchangers for transporting and recirculating the flue gas exiting the first and second heat exchangers;

(f) a first compressor or blower and a second compressor or blower for repressurizing and recirculating the flue gas, each compressor or blower connected to the first conduit and downstream of the first and second heat exchangers;

(g) a second conduit, downstream of and connected to the first compressor or blower, configured to transport a first portion of the recirculated flue gas, the second conduit having two branches, (1) the first branch of the second conduit configured to exhaust a first portion of the recirculated flue gas to atmosphere, and (2) the second branch of the second conduit configured to transport a second portion of the recirculated flue gas, the first recirculated flue gas stream, to an inlet supply connection connected to the partial premixer of the burner assembly;

(h) a third conduit, downstream of and connected to the second blower or compressor, configured to transport a second portion of the recirculated flue gas, the second recirculated flue gas stream, to the tertiary blending zone of the burner assembly;

(i) a fourth conduit in communication with a source of liquid or gaseous hydrocarbon fuel, the fourth conduit configured to supply the stream of liquid or gaseous hydrocarbon fuel to an inlet supply connection connected to the partial premixer of the burner assembly;

(j) a fifth conduit in communication with a source of the predominate oxygen mixture, the fifth conduit configured to supply the predominate oxygen mixture to an inlet supply connection connected to the partial premixer of the burner assembly; and (k) a means for control configured to maintain the flue gases in a cycle-continuous superheated state.

7. The partially-open heat regenerative oxygen-fuel fired heater cycle system of claim 6 wherein the control means is a control panel with a programmable logic controller.

8. The partially-open heat regenerative oxygen-fuel fired heater cycle system of claim 7 additionally including, (a) a first control valve in communication with the first conduit and downstream of the first heat exchanger;

(b) a second control valve in communication with the first conduit and downstream of the second heat exchanger;

(c) a third control valve in communication with the first branch of the second conduit;

(d) a fourth control valve in communication with the second branch of the second conduit;

(e) a fifth control valve in communication with the third conduit; and (f) a sixth control valve in communication with the fourth conduit.

9. The partially-open heat regenerative oxygen-fuel fired heater cycle system of claim 6 wherein the control means maintains a preferred temperature inside the primary ignition and combustion zone during combustion at or below 2,400 degrees Fahrenheit.

10. The partially-open heat regenerative oxygen-fuel fired heater cycle system of claim 6 wherein the control means optimizes the rate of heat transferred to the process liquid or gaseous fluid in the heat exchanger relative to the mass flow of the liquid or gaseous hydrocarbon fuel.

11. A partially-open heat regenerative oxygen-fuel fired heater cycle system developing low fugitive heater flue gas exhaust emissions during the system heating of a process liquid or gaseous fluid while exclusively using liquid or gaseous hydrocarbon fuel, the system comprising:

(a) a first burner assembly for mixing and combusting controlled streams of a liquid or gaseous hydrocarbon fuel, a pressurized predominate oxygen mixture, and a first recirculated flue gas, the burner assembly including, (1) inlet supply connections providing connectivity to the controlled streams of the fuel, predominate oxygen gas mixture, and first recirculated flue gas, (2) a partial premixer in communication with the inlet supply connections for mixing the controlled streams of the fuel, predominate oxygen mixture, and first recirculated flue gas, the first recirculated flue gas stream comprised predominately of carbon dioxide and water vapor, (3) a primary ignition and combustion zone connected to and downstream of the partial premixer for combusting the controlled streams of the fuel and predominate oxygen mixture resulting in a stream of gases in a superheated state comprised predominately of carbon dioxide and water vapor, (4) a tertiary blending zone for combining the streams of superheated gases and exhausting a flue gas, the tertiary blending zone connected to and positioned downstream of the primary ignition and combustion zone and configured to accept a source of a second recirculated flue gas stream, the second recirculated flue gas stream comprised predominately of carbon dioxide and water vapor;

(b) a second burner assembly in parallel with the first burner assembly;

(c) a flow transition, having two ends, one end in communication with and downstream of the burner assemblies and the other end connected to a heat exchanger;

(d) a heat exchanger connected to and downstream of the flow transition, the heat exchanger configured to accept the flue gas exhausted from the tertiary blending zone and transfer heat energy of the flue gas to a process liquid or gaseous fluid passed through the heat exchanger;

(e) a first conduit in communication with the heat exchanger for transporting and recirculating the flue gas exiting the heat exchanger;

(f) at least one compressor or blower, connected to the first conduit and downstream of the heat exchanger, for repressurizing and recirculating the flue gas;

(g) a second conduit, downstream of and connected to the compressor or blower, the second conduit having three branches, (1) the first branch of the second conduit configured to exhaust a first portion of the recirculated flue gas to atmosphere, (2) the second branch of the second conduit configured to transport a second portion of the recirculated flue gas, the first recirculated flue gas stream, to an inlet supply connection connected to the partial premixer of the burner assembly, (3) the third branch of the second conduit configured to transport a third portion of the recirculated flue gas, the second recirculated flue gas stream, to the tertiary blending zone of the burner assembly;

(h) a third conduit in communication with a source of the liquid or gaseous hydrocarbon fuel configured to supply the steam of liquid or gaseous hydrocarbon fuel to an inlet supply connection connected to the partial premixer of the burner assembly;

(i) a fourth conduit in communication with a source of the predominate oxygen gas mixture configured to supply the predominate oxygen mixture to an inlet supply connection connected to the partial premixer of the burner assembly; and (j) a means for control configured to maintain the flue gases in a cycle-continuous superheated state.

12. The partially-open heat regenerative oxygen-fuel fired heater cycle system of claim 11 wherein the control means is a computer.

13. The partially-open heat regenerative oxygen-fuel fired heater cycle system of claim 12 additionally including, (a) a first control valve in communication with the first branch of the second conduit;

(b) a second control valve in communication with the second branch of the second conduit;

(c) a third control valve in communication with the third branch of the second conduit; and (d) a fourth control valve in communication with the third conduit.

14. The partially-open heat regenerative oxygen-fuel fired heater cycle system of claim 11 wherein the control means maintains a preferred temperature inside the primary ignition and combustion zone during combustion at or below 2,400 degrees Fahrenheit.

15. The partially-open heat regenerative oxygen-fuel fired heater cycle system of claim 1 wherein the control means optimizes the heat transferred to the process liquid or gaseous fluid in the heat exchanger relative to the mass flow of the liquid or gaseous hydrocarbon fuel.

16. The partially-open heat regenerative oxygen-fuel fired heater cycle system of claim 11 additionally including, (a) a fourth conduit connected to the second branch of the second conduit;

(b) a control valve in communication with the fourth conduit and downstream of the second branch of the second conduit;

(c) a compressor or blower in communication with the fourth conduit and downstream of the control valve for additionally pressurizing the recirculated flue gas stream transported by the fourth conduit;

(d) a venturi-type blender in communication with the fourth conduit and downstream of the compressor or blower for blending the recirculated flue gas stream and a predominate oxygen mixture supplied by a source; and (e) an inlet supply connection, having two ends, one end in communication with the fourth conduit and downstream of the venturi-type blender and the other end connected to the partial premixer for transporting the blended mixture of the recirculated flue gas and the predominate oxygen mixture from the venturi-type blender to the partial premixer of the burner assembly.

17. The partially-open heat regenerative oxygen-fuel fired heater cycle system of claim 16 wherein the control means is a control panel with a programmable logic controller.

18. The partially-open heat regenerative oxygen-fuel fired heater cycle system of claim 17 additionally including, (a) a first control valve in communication with the first branch of the second conduit;

(b) a second control valve in communication with the second branch of the second conduit;

(c) a third control valve in communication with the third branch of the second conduit; and (d) a fourth control valve in communication with the third conduit.

19. The partially-open heat regenerative oxygen-fuel fired heater cycle system of claim 16 wherein the control means optimizes the heat transferred to the process liquid or gaseous fluid in the heat exchanger relative to the mass flow of the liquid or gaseous hydrocarbon fuel.

20. The partially-open heat regenerative oxygen-fuel fired heater cycle system of claim 11 wherein the first recirculated flue gas stream is comprised predominantly of binary and convective molecular carbon dioxide and water vapor gases.

* * * * *